United States Patent
Reddy et al.

(10) Patent No.: US 6,658,413 B1
(45) Date of Patent: Dec. 2, 2003

(54) MULTIDIMENSIONAL DATABASE SYSTEM WITH INTERMEDIATE LOCKABLE INTERSECTIONS

(75) Inventors: Venugopal P. Reddy, Madison, NJ (US); Harmindar S. Matharu, Lake Hiawatha, NJ (US)

(73) Assignee: i2 Technologies US, Inc., Dallas, TX (US)

( * ) Notice: Subject to any disclaimer, the term of this patent is extended or adjusted under 35 U.S.C. 154(b) by 540 days.

(21) Appl. No.: 09/653,107

(22) Filed: Aug. 31, 2000

Related U.S. Application Data

(60) Provisional application No. 60/151,969, filed on Sep. 1, 1999.

(51) Int. Cl.[7] .............................................. G06F 17/30
(52) U.S. Cl. ................... 707/8; 707/2; 707/9; 707/101
(58) Field of Search .......................... 707/2, 8, 9, 101

(56) References Cited

U.S. PATENT DOCUMENTS

| | | | |
|---|---|---|---|
| 5,794,229 A | 8/1998 | French et al. ................... 707/2 |
| 5,799,300 A | 8/1998 | Agrawal et al. ................ 707/5 |
| 5,832,475 A | * 11/1998 | Agrawal et al. ................ 707/2 |
| 5,835,910 A | 11/1998 | Kavanagh et al. ........... 707/103 |
| 5,899,993 A | * 5/1999 | Jenkins, Jr. ..................... 707/9 |
| 5,918,232 A | 6/1999 | Pouschine et al. ........... 707/103 |
| 5,943,677 A | 8/1999 | Hicks ........................ 707/205 |
| 6,282,544 B1 | * 8/2001 | Tse et al. ..................... 707/101 |
| 6,353,828 B1 | * 3/2002 | Ganesh et al. ................... 707/8 |
| 6,374,263 B1 | * 4/2002 | Bunger et al. .............. 707/201 |
| 6,434,544 B1 | * 8/2002 | Bakalash et al. ............... 707/2 |
| 6,480,849 B1 | * 11/2002 | Lee et al. ....................... 707/8 |
| 6,480,850 B1 | * 11/2002 | Veldhuisen .................... 707/9 |
| 6,484,172 B1 | * 11/2002 | Lee et al. ....................... 707/8 |

FOREIGN PATENT DOCUMENTS

WO  WO 01/16808 A1  * 3/2001  ........... G06F/17/30

OTHER PUBLICATIONS

Notification of Transmittal of International Preliminary Examination Report, 4 pages, Aug. 23, 2001.
PCT International Search Report for International Application No. PCT/US00/24356 dated Dec. 29, 2000.

\* cited by examiner

*Primary Examiner*—Greta Robinson
*Assistant Examiner*—Debbie M. Le
(74) *Attorney, Agent, or Firm*—Baker Botts L.L.P.

(57) ABSTRACT

A multi-dimensional database includes hierarchical levels. The data is hierarchical, with aggregatable data measures, so that changes in a first intersection will cause changes in other intersections for the aggregated measure. Selected intersections can be locked, so that changes in aggregatable data are restricted. Constrained sets corresponding to the locked intersections limit the scope of changes which may be made, and ensure a high level of efficiency.

3 Claims, 5 Drawing Sheets

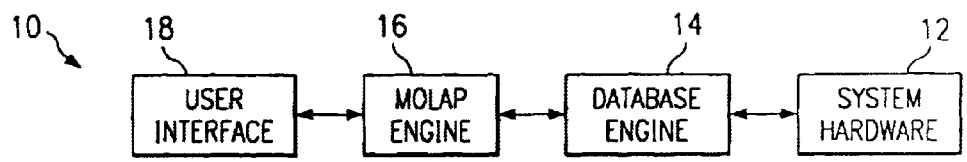
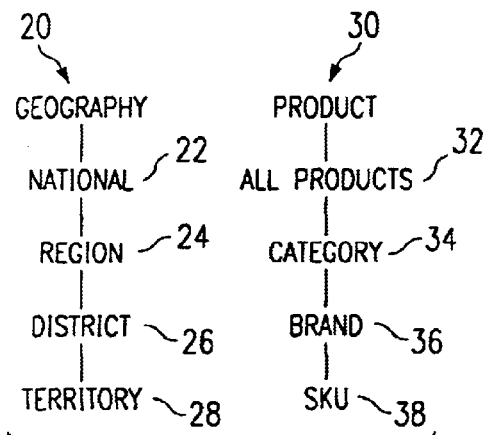
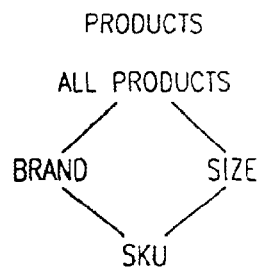
FIG. 4
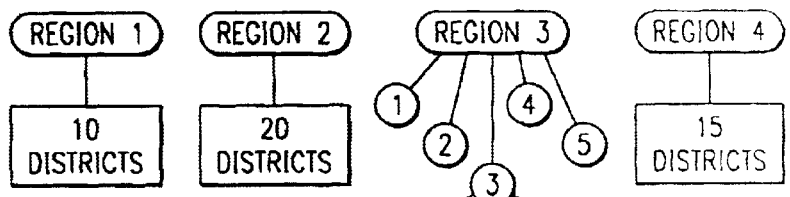
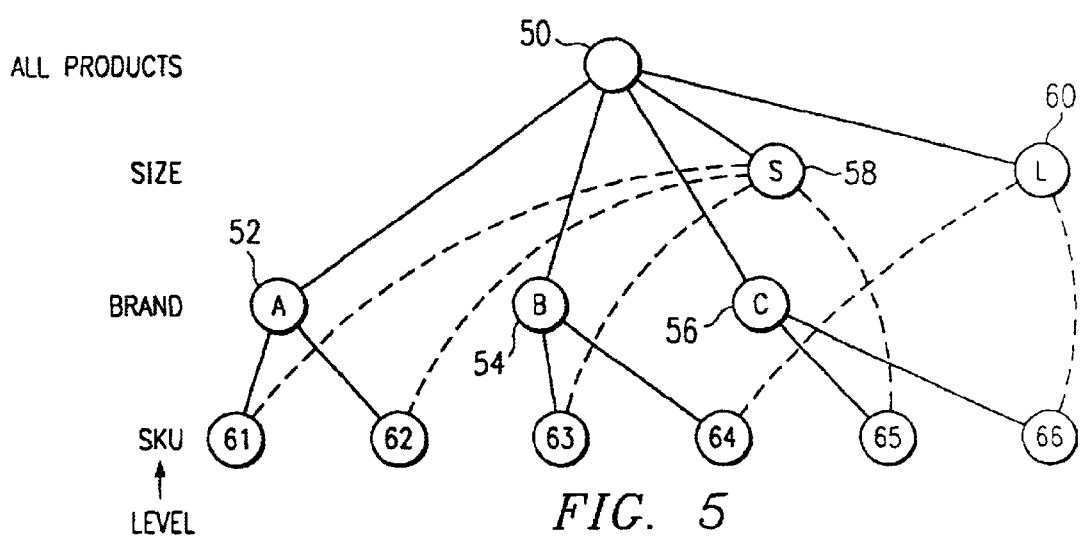
FIG. 5

When an intersection is locked (an indirectly locked intersection cannot be directly locked) :

Partition the anchor intersections by the *constrained sets* they belong to - the intersections belonging to the *unconstrained set* belong to a separate partition.

Identify the partitions which are identical to the corresponding *constrained sets* (no additional members in the *constrained sets*) and remove them from the collection.

With each remaining partition, remove the intersections from the *constrained/unconstrained* sets they belong to and form a new *constrained set*.

FIG. 6

For each *constrained set* covered by the unlocked intersection,

If the *constrained set* is not covered by any other direct lock

Merge the *constrained set* with the *unconstrained set*.

Otherwise,

Find all (directly) locked intersections covering the *constrained set*.

If there exists another *constrained set* covered by all the *locked intersections* collected in the previous step and by no other locked intersection Merge the two constrained sets Endif Endif Endfor

FIG. 8

Partition all anchor intersections by the *constrained sets* they belong to - ignore the intersections belonging to the *unconstrained set*.

Identify the partitions which are identical to the corresponding *constrained sets* (no additional members in the *constrained sets*) and remove them from the collection - if the collection becomes empty the update is rejected (the updated intersection is indirectly locked)

Dis-aggregate the updated number to all the remaining anchor intersections according to the dis-aggregation profile.

Compute the total change to the anchor intersections by each partition: sum of the difference between the new number and the old number stored at each intersection.

Adjust the change among the other members of each *constrained set* so that the total change made to each *constrained set* is zero - dis-aggregate the negative change among the remaining members of each *constrained set* using a default profile.

Aggregate all changed anchor intersections - since total change to every *constrained set* is zero the integrity of locks is maintained.

*FIG. 7*

When an intersection is locked (an indirectly locked intersection cannot be directly locked):

> If this is the first intersection to be locked
>
>> Form a *constrained set* with all its anchor level intersections and remove them from the *unconstrained set*.
>>
>> Attach the *constrained set* to the locked intersection
>
> Otherwise, if the new intersection completely overlaps zero or more of the roots of the lock trees and does not partially overlap any of the rest of the roots
>
>> Identify all the anchor level intersections (covered by the locked intersection) belonging to the *unconstrained set*
>>
>> Form a *constrained set* with all these anchor intersections and remove them from the *unconstrained set*.
>>
>> Attach the new *constrained set* to the locked intersection
>>
>> Make the new intersection the parent of all the lock trees whose roots it overlaps.
>
> Otherwise, if the locked intersection is overlapped by one of the root nodes
>
>> Traverse the lock tree and find where the lock can be inserted - find a *parent node* that completely overlaps the new node such that none of its children partially overlaps the new intersection
>>
>> If a *parent node* (as described above) can be found
>>
>>> Identify all the anchor level intersections (covered by the locked intersection) belonging to the *parent node's constrained set*.

*FIG. 9A*

Form a *constrained set* with all these anchor intersections and remove them from the *constrained set* of the *parent node*.

Attach the new *constrained set* to the locked intersection

Make the new intersection the child of the *parent node* and the parent of all *parent node's* former children which are overlapped by the new intersection.

Otherwise, (partially overlaps an internal node of a lock tree)

Reject the lock
Endif

Otherwise, (partially overlaps one of the root nodes)

Reject the lock
Endif

*FIG. 9B*

If the intersection being unlocked is the root of a lock tree

Merge its *constrained set* with the *unconstrained set* - move the members of the *constrained set* to the *unconstrained set*.

Delete the intersection from the tree by making each of its subtrees a separate tree Otherwise, Merge its *constrained set* with its parent's *constrained set* - move the members of the unlocked intersection's *constrained set* to the parent's *constrained set*.

Delete the intersection from the tree by making its parent the parent of all its (the node being removed) children.

Endif

*FIG. 10*

MULTIDIMENSIONAL DATABASE SYSTEM WITH INTERMEDIATE LOCKABLE INTERSECTIONS

CROSS-REFERENCE TO RELATED APPLICATIONS

This Application claims the benefit of U.S. Provisional Application No. 60/151,969 filed Sep. 1, 1999. In addition, it contains subject matter in common with U.S. patent application Ser. No. 09/652,520, filed on even date herewith, titled CONFIGURABLE SPACE-TIME PERFORMANCE TRADE-OFF IN MULTIDIMENSIONAL DATABASE SYSTEMS, which is assigned to the assignee hereof and incorporated by reference hereinto.

BACKGROUND OF THE INVENTION

1. Field of the Invention

The present invention relates generally to data storage in computer systems, and more specifically to a system and method, for use in a multidimensional database system, for locking intermediate intersections of bi-directional integrity data measures.

2. Description of the Prior Art

With the continued increase in computer system processing power and data storage capabilities, increasingly large databases are being made widely available. Simple database designs which work for small databases are generally unsuitable for very large databases, because access times tend to increase geometrically with the size of the database. Even with greatly enhanced processing power, times to access very large databases can become unmanageably long unless care is taken in design of the database.

One database design in common use at the present time is OLAP. This database design technique can be run on several different types of underlying database engines, such as those commercially available from Hyperion, Oracle, and i2 Technologies. In addition to 1-dimenstional OLAP database structures, of particular interest to the present invention are MOLAP (Multidimensional OLAP) systems.

In such systems, some types of data, often referred to as aggregated data, can be pre-computed in order to improve read access times. Data that is suitable to be aggregated is that wherein, in a multidimensional database, data for a higher level may be generated using the data for lower level members within the structure. For example, unit sales of a product can be aggregated in a database which defines multiple sales territories within a sales region; the aggregate unit sales for the region is the sum of the sales for the individual. territories.

In order to improve read access times, such aggregatable data can be precomputed, and stored in various locations within the database. In the above example, the region sales data for a product can be stored within the region entry, so that it can be directly accessed at run time by reading each of the sales territory numbers once, and storing the sum in the corresponding region entry. It is not necessary to access each of the sales territories when total sales for the region is desired.

Aggregatable data can cause problems in certain circumstances, such as when the database is used for demand planning and forecasting. Changing a particular intersection will change other entries if the changed data is aggregatable, which may not be desired. In order to improve usefulness of such databases with hierarchically aggregated data, it would be desirable to provide a mechanism for locking the values for selected intersections, while leaving others free to be changed such that aggregation integrity is preserved. Preferably, changes would be allowed to be made directly or indirectly. A system and method for allowing selected intersections to be locked against changes will preferably operate in a reasonably efficient manner.

SUMMARY OF THE INVENTION

In accordance with the present invention, a multidimensional database includes hierarchical levels. The data is hierarchical, with aggregatable data measures, so that changes in a first intersection will cause changes in other intersections for the aggregated measure. Selected intersections can be locked, so that changes in aggregatable data are restricted. Constrained sets corresponding to the locked intersections limit the scope of changes which may be made, and ensure a high level of efficiency.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a high level block diagram of a database system;

FIG. 2 is a representation of the levels within two database dimensions;

FIG. 3 is a tree diagram illustrating various features of a database structure;

FIG. 4 is a diagram illustrating a hierarchical data structure;

FIG. 5 is a more detailed diagram corresponding to FIG. 4; and

FIGS. 6–10 are pseudocode illustrating operation of the preferred embodiment.

DESCRIPTION OF THE PREFERRED EMBODIMENT

The technique of the present invention can be used in different types of multidimensional database systems. It is particularly useful in a MOLAP engine running on any of a number of widely available database engines.

A high level diagram of a typical system on which the software implementing the invention can be run is shown in FIG. 1. The system 10 runs on system hardware 12. System hardware 12 is intended to be representative of both the physical hardware of the computer system, and various operating system and other low-level utilities. A database engine 14 runs on system hardware 12, and can be any engine such as is widely available from numerous sources. A MOLAP engine 16 runs on the database engine 14, and is accessed through a user interface 18. Except for the improvements of the invention described below, each of these pieces can be a generally available component as is well known in the prior art.

The following description includes definitions of some basic terms used in the remainder of the description. Several examples, and the processes of the inventive method, are then described, followed by a detailed description of the operating properties of a suitable MOLAP system in which the invention is preferably practiced.

A dimension is a logical grouping of unique entities that are called members of the dimension. Each of these members is uniquely identifiable. Each dimension is uniquely identified by a name.

A hierarchical dimensional is a dimension whose members are partitioned into named levels. These levels have a partial order imposed on them. The partial order between levels is transitive: If A is related to B, and B is related to C, then A is related to C. Members of any two related levels have a one-to-many relationship defined between them. These levels are called higher (ancestor) and lower (descendant) levels respectively.

If level Y is the ancestor of X, then the relationship between the levels can be represented as Y>X. A parent of a level X is the ancestor level Y where there does not exist a level Z such that Y>Z>X. If Y is a parent of X, X is a child of Y. This relation is a partial ordering, as a level can have both more than one parent, and more than one child. For example, level A can have two children B and C (A>B and A>C), and B and C can share a child level D. (B>D and C>D) In such a case, B and C define parallel paths, and need not be related.

A dimension intersection for a set of dimensions is a set of members where one member belongs to each dimension. An intersection can have more than one member from a single dimension, but for purposes of simplicity, the description below will give examples in which each intersection includes one member from each dimension involved in the intersection.

A data element is preferably treated as a (property, value) pair. The property represents the name of a data measure which results in a value given a member in every dimension that the data depends upon. A data measure, generally, is a property that is dependent on a subset of the defined dimensions. A data measure yields a scalar value at an intersection of its dependent dimensions.

An aggregatable data measure is defined with a lower bound level in each of its dependent dimensions. The data measure can have data values for a subset of intersections of lower bound level members of every dependent dimension. Aggregateable data measures use an aggregation method to generate data for an ancestor level member given data for all its children at one of its descendant levels. An example of an aggregation method is summation, i.e., summing of values in descendant levels to be stored in an ancestor level.

FIG. 2 gives examples of two dimensions which are used in the subsequent description. Geography dimension 20 includes four levels of its members in a hierarchical order: National level 22, region level 24, district level 26, and territory level 28. In a similar manner, product dimension 30 includes four hierarchical levels: All products 32, category 34, brand 36, and SKU (Stock-Keeping Unit) 38.

As a simple example, members of each dimension can have a straightforward hierarchical relationship with members of its ancestor and descendant levels. FIG. 3 shows an example in which the region level has 4 members, region 1, region 2, region 3, and region 4. Each region has some number of child, districts, which varies by region. In the example of FIG. 3, region 1 has 10 districts, region 2 has 20, region 3 has 5, and region 4 has 15 districts.

Only the five district members of region 3 are individually illustrated in FIG. 3. In addition, only the six territory level members of region 3-district 3 are illustrated. The territories of the remaining districts of region 3, and further remaining districts of the other regions, are not shown in FIG. 3 for simplicity.

In FIG. 3, region 3 is a parent of each of its districts 1, 2, 3, 4, and 5. It is an ancestor, though not a parent, of each of the territories 1–6 within region 3.

In a similar manner, product dimension 30 will have a number of categories, brands, and SKUs. As an example, three product categories could be defined, having 5, 4, and 3 brands respectively. Each brand has a number of SKUs.

The preferred data base system is hierarchical; that is, it allows a more complex relationship between levels of a dimension. The relationship between levels need not be the simple linear one shown in FIG. 2, but can be more complex. A very simple example illustrating a more complex hierarchy is shown in FIG. 4. In this example, the product dimension has Brand and SKU levels similar to the previous example. It also includes a Size level that is not related to the Brand level. The SKU level thus has two parent levels, and the All Products level has two children. As will be appreciated by those skilled in the art, more complex level relationships can be defined as desired. However, to simplify the following explanation, the hierarchy of FIG. 4 will be used as the basis for the following description.

A bi-directional data measure has an integrity constraint: the data at a member of a level (given a member of each of the other dimensions) is equal to the sum of all its children belonging to a child level. A bi-directional data measure always has a level below which data is not defined which is designated as the anchor level of the data measure. The anchor level need not be the lowest level in the dimension.

For example, in FIG. 4 the bi-directional data measure M1 can depend on dimension PRODUCTS, and have level SKU as its anchor level. If there were any more levels below SKU, M1 would not be defined at any members of the lower level when SKU is designated as the anchor level.

The set of anchor level children of an intersection are said to be covered by the intersection and is called the scope of the intersection.

When a bi-directional data measure is modified, data is first disaggregated to its anchor level children (using a dis-aggregation profile called a basis). It is then aggregated along all the paths updating the higher levels thus maintaining the integrity constraint described earlier. For example, all modifications to M1 at any level are first dis-aggregated to level SKU and then aggregated up to all levels.

FIG. 5 shows additional details of the hierarchy shown in FIG. 4. In this simplified example, level All Products has a single member 50. A data measure fro sales is aggregated, so that member 50, an intersection in the database, sums all sales within the company. Three brands of products are shown, Brand A (52), Brand B (54) and Brand C (56). Each brand has 2 children in the SKU level, 51 56. As is generally known, each SKU member represents a particular unique item, such as a particular size or color of a product.

The products may also be categorized by size, in this case Small (58) or Large (60) as shown in the size level. Each SKU also has a size, although in the general case the two unrelated levels Brand and Size need not cover exactly the same set of SKU intersections. In this example, it is seen that Brand A 52 has 2 SKUs 51, 52 that are both size small. Brands B and C each have one small SKU 53, 55 and one large SKU 54, 56.

Locking an intersection requires the system to keep the locked value constant during both dis-aggregation and aggregation when any unlocked intersection is modified while maintaining the aggregation integrity. The locked intersection and modified intersection may belong to different paths. For example, in the above case, a locked intersection may belong to level Brand and a member of level Size may be modified.

The challenge is to find a scheme to dis-aggregate the change to the anchor level such that the subsequent aggregation does not violate the locking. For performance reasons, this needs to be accomplished accessing only the anchor level intersections. In other words, dis-aggregation is required to be performed without visiting any alternate aggregation paths of the dimension.

Additionally, locking some intersections may cause some other intersections to be locked indirectly because, these intersections cannot be modified without modifying one of the locked intersections. For example, if the parent and all but one children are locked, the remaining child cannot be changed thereby becoming indirectly locked. This determination of the indirectly locked intersections is built into the method of the preferred embodiment so that no additional computation (compared to what is needed to enforce direct locks) is necessary to enforce the indirect locks.

The method of the preferred embodiment described herein discusses all the information that needs to be maintained at the anchor level and the dis-aggregation method to be followed to perform updates in the presence of locks. In the example of FIG. 5, the anchor level is defined to be the SKU level for the aggregatable data measure unit sales.

When an intersection is modified, all the anchor level intersections in the scope need to be examined. All the anchor level intersections covered by a locked intersection need to be identified. Since changes made to these intersections affect the locked intersections, the changes need to be compensated by propagating the negative changes to other anchor level intersections covered by the locked intersection. For example, assume that Brand A 52 is locked at a sales value of 1000. Intersections 61 and 62 are covered by member 52. If the value for member 61 is changed from 500 units to 600 units, the value for member 62 must be changed from 500 to 400, so that the aggregate sum for Brand A 52 remains at 1000. If a similar change is made to locked intersection Brand B 54, in addition to changing the children SKU members 63, 64, the size members 58, 60 must also be updated.

If an anchor level intersection is covered by multiple locked intersections, this propagation can get unwieldy. Additionally, if any of the anchor level intersections to which the negative change is propagated is covered by another locked intersection, the process becomes complicated even further.

Therefore, in the preferred embodiment, all anchor level intersections that need to be adjusted together should "belong" to one entity (eg. a locked intersection). In other words, all anchor level intersections are partitioned into subsets such that each intersection belongs to exactly one such subset. A constraint is placed on all but one of these subsets: the sum of all intersections is constant. In this description, these subsets are called constrained sets. The remaining subset has no constraints and intersections are free to be modified. This subset is called the unconstrained set.

Each constrained set should be formed such that the locks are not violated as long as the constraints are not violated. This requires that members of the unconstrained set are not covered by any of the locked intersections.

Trivially, this can be achieved by placing each anchor intersection covered by a locked intersection into its own constrained set. But, this has the undesirable effect of making all children of every locked intersection effectively locked. So, the preferred method uses a technique of constructing these constrained sets such that maximum freedom of modification is achieved.

The techniques for generating constrained sets and updating data in the presence of constrained sets in connection with FIGS. 6–10. The procedure is detailed in the figures, and the following text relates the figures to the database shown in FIG. 5.

Initially, before any intersections in the database are locked, there is only the unconstrained set. Only after one or more intersections are locked do any members become part of a constrained set. FIG. 6 illustrates the preferred method for locking an intersection. An already locked intersection cannot be relocked, and an indirectly locked intersection cannot be locked.

As shown in FIG. 6, the first step is to partition the anchor intersections. For the first intersection to be locked, this step is a no-operation. The anchor intersections to be partitioned are only those that are within the scope of the intersection to be locked. In other words, only those anchor intersections that have the intersection to be locked in their aggregation path are partitioned. These are the intersections that make up the initial collection to be considered. In FIG. 5, assuming intersection Brand A 52 is to be locked, only SKU intersections 61 and 62 are placed in the collection by this step.

The next step is to identify partitions that are identical to the corresponding constrained sets, and remove them. These constrained sets are unchanged. Then, for partitions that overlap a constrained set, the partitions are split into two constrained sets. For example, in FIG. 5, assume Brand A 52 and Brand B 54 are locked, then an attempt is made to lock Size Small 58. Anchor intersections 61, 62, 63, 64, and 65 will split into the following constrained sets: (61, 62) will remain a constrained set; (63, 64) will be split into two constrained sets, (63) and (64); and the remaining member in the unconstrained set, SKU 65, will be placed into the new constrained set.

The result of this rule is that no anchor level intersection can be in more than one constrained set. A locked intersection can have many constrained sets associated with it.

In the third step, the remaining members are placed into the new constrained set. When locking Size Small 58, SKU members 63 and 65 are placed in the constrained set, assuming that members 61 and 62 were previously removed because Brand A 52 was previously locked. If brand A 52 had not been previously locked, 61, 62, 63 and 65 would all be included in the constrained set corresponding to intersection 58.

Referring to FIG. 7, the method for updating an intersection is shown. A directly locked intersection cannot be updated. This method starts out with a partitioning similar to that described in connection with FIG. 6. Once the constrained sets are identified, the partitions that are identical to their constrained sets are removed. The remaining four steps cause the changes made at the updated intersection to be spread out among the other intersections so that no locks are violated.

In a simple example, assume that Brand A 52 and Brand B 54 are both locked, and set at a value of 1000 each. Assume each of the SKU members 61–66 is 500 units. Brand C 56 therefore aggregates to 1000 units, but is not locked. Size Small 58 is unlocked, and aggregates to 2000 units, while unlocked size large aggregates to 1000 units.

Size Small 58 is to be changed from 2000 to 1500 units. By the second step of FIG. 7, the constrained set of 61 and 62 is identical with the partition, so these are removed from consideration. In other words, in this hierarchy, locking Brand A 52 prevents 61 and 62 from being changed. The constraint set including SKU 63 remains, however, even though Brand B 53 is locked, because SKU 63 is only a subset of the constrained set 63 and 64 formed by the locked Brand B 54. This leaves SKU members 63 and 65 in the collection to be changed by the change to member 58. Assuming the dis-aggregation profile is to change all affected intersections proportionally, each SKU member 63 and 65 is decreased by 250 units.

By step 5, because Brand B 54 is locked, 54 must remain at 1000. This requires SKU 64 to be adjusted to 750, to balance the decrease of 250 in SKU 63. This will in turn cause the aggregation value of Size Large 60 to increase by 250. Because Brand C 56 is not locked, the change to SKU 65 does not affect SKU 66.

A simple method for unlocking an intersection is shown in FIG. 8. Only directly locked intersections can be unlocked. If the constrained set to be released is not covered by any other direct lock, the members of the set are merged into the unconstrained set. The members of the set are released if the conditions of the otherwise clause are met, else they remain as they are. If another constrained set is covered by all of the locked intersections that cover the constrained set to be released, then the sets are merged. To find out what sets are to be merged, it is possible that all combinations of constrained sets may need to be examined.

In the worst case, this simple unlocking method is nearly exponential on the number of constrained sets. Therefore, a restriction is placed on the intersections that can be locked to limit the damage to performance. This is done by defining certain types of intersections as lockable, and allowing only those to be locked.

An intersection is lockable if and only if the scope of the intersection to be locked:

i) does not overlap the scope of any existing (directly) locked intersection or
  ii) either completely overlaps or is completely overlapped by all the existing (directly) locked intersection scopes In other words, an intersection is not lockable if its scope partially overlaps the scope of another (directly) locked intersection. In the database of FIG. 5, this approach defines Size Small 58 to be lockable even if Brand A 52 is locked, but not if Brand B 54 is locked. The determination of a lockable intersection is determined at the time a lock is attempted, and will change as locks are added and removed elsewhere.

Placing this restriction allows all the directly locked intersections to be placed into a set of hierarchical trees, where the scope of each node completely overlaps all its children scopes. Consequently, only one new constrained set is created by each new lock, as shown in the modified methods of FIGS. 9 and 10.

FIG. 9 illustrates the preferred method for locking an intersection. As in the previous description, all intersections are initially in the unconstrained set. The first intersection to be locked simply defines its anchor level intersections to be the first constrained set. After the first set is defined, the determination of whether a set is lockable must be made whenever an attempt is made to lock an intersection.

The first otherwise statement checks for proper overlap, as defined above, by determining whether a complete overlap exists with any locked children and other descendants of the intersection being locked. The second otherwise statement checks for proper overlap among the parents and other ancestors of the intersection being locked. Both directions must be checked to ensure that the intersection is actually lockable. If it is not, then the proposed lock is not allowed to be placed on the intersection.

Updates to an intersection are preformed exactly as described above. Once a node is locked, the status of other nodes as lockable or not has no impact on updates. Unlocking an intersection differs from the previous method, and is shown in FIG. 10. As is seen, either the constrained set for the: intersection is released to the unconstrained set (if the released intersection was the root of a lock tree), or the members of the constrained set are merged with the constrained set of the parent. In both cases the node is removed from the lock tree.

Maintenance of the separate lock tree data structures is well known in the art; the lock trees can be implemented using any desired technique for maintaining data trees. This unlocking method minimizes the number of visits that need to be made to an intersection when unlocking an intersection, thus improving performance at the cost of limiting the number of intersections which are lockable.

Although the methods described above for locking, updating, and unlocking nodes can be applied to different database designs, the preferred embodiment is more completely defined to have particular characteristics. The characteristics of principal importance are now described as a set of properties for elements of the database, with some examples given to illustrate them.

Dimension

Description

A dimension is a logical grouping of unique entities that are called members of the dimension. Every member of a dimension has a code and a description associated with it. Dimensions have a unique name and any number of unique aliases associated which can be used to refer to it.

EXAMPLE

Geography dimension has members Eastern Region, Western Region, New York Territory and so on.

Dimension Intersection

Description

A dimension intersection for a set of dimensions is a set of members where one member belongs to each dimension. An intersection can have more than one member from a single dimension. Each of these dimensions needs to be identified with a unique alias name.

EXAMPLE

Brand Cookies, Region Eastern, January 1995 is one Intersection of the Product, Geography, Time Dimension set Data Description A data element can be viewed as a (property, value) pair. Property represents the name of a data measure which results in a value given a member in every dimension that the data depends on. The data may not require identification of members in all defined dimensions. Dimensions on which the data measure depends are called dependent dimensions and those on which it does not depend are called independent dimensions. Data can depend on the same dimension more than once in which case multiple positions of the dimension need to be identified to obtain the data values.

Dimensions can be classified as sparse or dense depending upon availability of data elements. A dense dimension has meaningful data for a subset of its members irrespective of the members of the other dimensions. A sparse dimension is one where the availability of a data element depends on members of the other dimensions. Sparseness or density of a dimension can vary by data element.

EXAMPLE

Unit Sales, Price are all data measures. (Unit Sales, 1000)—identifies the value for Unit Sales at Eastern Region, Cookies Brand and Q1-1997. Unit Sales depends on Geography, Product and Time. Whereas Price is dependent on Product and Time and is independent of Geography. Time is a dense dimension for the measure Unit Sales and sparse dimension for Price.

Hierarchical Dimension

Description

Members of a hierarchical dimension are partitioned into named levels. These levels have a partial order imposed on them. The partial order between levels is transitive: If A is related to B, and B is related to C, then A is related to C. Members of any two related levels have a one-to-many relationship defined between them. These levels are called higher (ancestor) and lower (descendant) levels respectively.

If level Y is the ancestor of X, then Y>X (read as, "Y is ancestor of X"). A parent of a level X is the ancestor level Y where no level Z exists such that Y>Z>X.

In case of sequenced dimensions, a sequence is imposed within the members of a level. If a sequence is imposed on multiple levels of a dimension, the sequence needs to be consistent across the levels. In other words, if sequenced level X is an ancestor of sequenced level Y and member x[1] of level X is before member x[2], then any y[i] which is a child of x[1] is before any y[i] which is a child of x[2].

Every level in a dimension can have user specified thresholds which are used to determine the storage strategy of aggregatable measures. The system keeps track of the minimum number of child members that need to be accessed to compute data at every member of a dimension. Every member is flagged "to be stored" if the count is more than the upper threshold and "not to be stored" if the count is less than the lower threshold. The flag is changed to "to be stored"when the count goes above the upper threshold and to "not to be stored" when the count goes below the lower threshold.

EXAMPLE

Quarter and Month are names of levels of the Time Dimension. Region and District are names of levels of the Geography Dimension.

Product Dimension can have All Products, Brand, Size and SKU as levels with the order All Products>Brand, Brand>SKU, All Products>Size, Size>SKU. All Products is higher than Brand and Brand is an ancestor of SKU. Brand and Size are not related to each other. Members of Size could be Big, Medium and Small.

The Cookies Brand is a member of level Brand and is the parent of Chocolate Chip, Oatmeal Raisin and Macadamia Nut SKUs.

The month is a sequenced level of dimension Time and may have members January 1995 . . . December 1996 with a system recognized sequence. Quarter is an ancestor of Month and is sequenced. If Qtr1 is before Qtr2 then all months in Qtr1 are before all the months in Qtr2.

Aggregation Path

Description

Given a member x of a level X, there exists a member y related to x in every ancestor level Y of X. This is called the set of ancestor members of x. The members in the ancestor set of x may or may not be related to each other. Aggregation path of member x, is defined as a subset of ancestor members of x that have a total order imposed on them. In other words, every pair of members in the aggregation path are related to each other.

EXAMPLE

In the hierarchical dimension example, one aggregation path for Chocolate Chip cookies contains Cookies Brand and All Products (the only member of the All Products level).

Multiple Hierarchies or Multiple Aggregation Paths

Description

Each member can have more than one aggregation path to facilitate grouping by different attributes which are members of unrelated levels.

Thus a member can have multiple parents resulting in multiple hierarchies in a dimension.

EXAMPLE

SKU can be grouped by Brand or Size. The two aggregation paths for a member of the SKU level are Cookies Brand-AllProducts and Big-AllProducts. The parents of Chocolate Chip (SKU) could be Cookies (Brand) and Big (Size). The two hierarchies of the Product dimension are AllProducts-Brand-SKU and AllProducts-Size-SKU.

Split Dimension

Description

A dimension can be split in such a way that different levels can be independently selected to identify a data element.

Splitting is done by selecting a level X as one of the dimensions. The uniqueness of this dimension will remain the same. All the levels of the original dimension which have X as one of their ancestors form the new dimension and the relations among these levels remain unchanged. The uniqueness of the newly formed levels is obtained by subtracting the uniqueness of X from their original uniqueness. Dimensions can be split at run-time. Split dimensions can be split further.

EXAMPLE

January 1995 could be defined as an unique member of the level month of Time Dimension. Another way to define it is as member January of level Month and a descendent of member 1995 of level Year. If the latter method is used to define the Month and Year levels, then the Time dimension can be split between Year and Month and viewed in a spreadsheet with Month going down (rows) and Year going across (columns).

Combined Dimension

Description

A Combined dimension is a combination of two or more dimension. All members of the Cartesian product of the dimensions to be combined are members of the combined dimension. Two levels of a combined dimension are related if one component of one of the levels is related to the corresponding component of the second level provided all the other components match. A combined dimension can be defined at run time and is uniquely identified by a name.

EXAMPLE

Consider two dimensions defined by a partially ordered set of levels. Let {A1, A2, A3, A4} be the levels of dimension A and {B1, B2, B3, B4} be the levels of dimension B. Then the set of levels {A1B1, A1B2, A1B3, A1B4, A2B1, A2B2, A2B3, A2B4, A3B1, A3B2, A3B3, A3B4, A4B1, A4B2, A4B3, A4B4} is the new formed combined dimension.

If A1>A2 then A1X>A2X for all X belonging to dimension B.

Uniqueness

Description

Every member of a level is identified using a code. The member code may not be unique by itself but requires to be unique within the dimension when qualified by all its ancestor member codes. The uniqueness of a level is the set of all its ancestor levels.

EXAMPLE

In the split dimension example, the code assigned to January could be 01, February—02, Year 1995—95, Year 1996—96. and so on. To uniquely identify Month January of Year 1995, the combined code of Month and Year which is 9501 is needed. The uniqueness of level Month contains the Month and Year

Adding Dimension Members

Description

Dimension members can be loaded at any level by specifying all the components of the uniqueness of the level. The system will add the ancestor members to all ancestor levels if required. In other words, all members of a dimension need to have all their ancestors defined but need not have their descendants defined. Adding dimension members is a multi-user operation and is available to every user with the required access.

Consolidated Level

Description

A consolidation of a level X within an ancestor level Y is defined as the set of unique members that result by adding level X to the uniqueness of Y and applying the resulting set to level X. The members of the new level Z thus formed are assigned new descriptions and the level has the following relations:

Y>Z

Z>X

A consolidation of a level X can also be defined as the set of unique members within X. The uniqueness of the new level Z will contain itself only. In this case, the new level Z has the following relation:

Z>X

Consolidated levels are definable at run-time. Consolidated levels can be used in all operations where a pre-defined level can be used.

In case of aggregatable data measures, the defined aggregation method is used to compute data at the members of the new level. In case of non-aggregatable measures, the default access method defined for the measure is used to generate data.

EXAMPLE

If all the corresponding months of every year are assigned the same code (code of January is 01 in years 1995, 1996 and 1997 and so on) then a consolidated level called "Consolidated Month" could be defined at run-time for level Month within the AllYears level to compare data by months across all years. The data for January will be an aggregation of January 1995, 1996, 1997 and so on.

The uniqueness of the Month level is {AllYears, Year, Month}. The uniqueness of Consolidated Month is formed by adding Month to the uniqueness of AllYears: {AllYears, Month}

Custom Level

Description

A custom level of a level X within an ancestor Y is defined by merging sub-groups of members of X that are related to a single member of Y. This could be performed for multiple members of Y. The members of new level Z thus formed are assigned new codes and descriptions and the level has the following relations:

Y>Z

Z>X

Custom levels can also be defined on level X without being bound by an ancestor level. In this case the new level defined Z has the following relation:

Z>X

Custom levels are definable at run-time. Custom levels can be used in all operations where a pre-defined level can be used.

In case of aggregatable data measures, the defined aggregation method is used to compute data at the members of the new level. In case of non-aggregatable measures, the default access method defined for the measure is used to generate data.

EXAMPLE

A new grouping attribute called Packaging could be added to the Product dimension at run-time. To do this a custom level called Packaging could be defined from SKU within the ancestor level Size by combining SKUs of similar packaging into one member. Chocolate Chip and Macadamia Nut could be combined into one member of the Packaging level and Oatmeal Raisin could form another Packaging member.

Custom Group

Description

Custom group is a subset of members of dimension. Custom groups can be defined by arbitrary selection, tree, or using expressions on data measures dependent on this dimension alone.

Tree is defined by a position p (level member), a level S related (ancestor or descendent) to the level of the position x where the tree starts and a descendent level E of the start level where the tree ends. The level S can be above or below the level of the p. The custom group contains all members that are related to p belonging to the levels X such that X is the same as or a descendent of level S and is the same as or a an ancestor of level E.

Set of trees or Range of trees are example of a Custom Group.

Custom Scope

Description

Scope is a set of non-overlapping members of a dimension. Two members of a dimension are non-overlapping if they do not have any common children(other members of the same dimension belonging to the descendent levels).

Set of members of a level and Range of members of a sequenced level are examples of scope.

Data Measure

Description

A data measure is a property that is dependent on a subset of the defined dimensions. The subset of dimensions on which a data measure is dependent is called its Dimensionality. Dimension aliases can be used if a data measure is dependent on the same dimension more than once. In other words, specification of more than one position of such dimensions is needed to access the data stored in the measure.

Data measure yields a scalar value at an intersection of its dependent dimensions. The scalar value is undefined if the intersection is not stored subject to access methods discussed below. The intersection of a subset of dependent dimensions results in a multi-dimensional array of values where the axes represent the dimensions that are not part of the intersection.

There are two kinds of data measures: Aggregatable and Non-aggregatable.

Another categorization for data measures storing numeric values is Signed and Unsigned where Unsigned data measures can not accept negative numbers. In case of signed data measures negative numbers can be locked and locking an intersection does not prevent negative number storage in the measure.

EXAMPLE

Unit Sales, Price, Actual Dollars, Forecast Units are all data measures.

(Unit Sales, 1000)—identifies the value for Unit Sales at the intersection [Eastern Region, Cookies Brand, Q1-1997].

The intersection [Eastern Region, Cookies Brand] results in a one-dimensional array of scalar values for all the time dimension members.

Data Type

Description

The type of the scalar value to be stored at an intersection for a given data measure could be one of Numeric(specified as maximum number of digits stored and implied number of decimal places), Integer(maximum number of digits and implied number of trailing zeros not to be stored), Boolean, String & BLOB(Binary Large Object). A Reference data type will also be supported to store references to application objects.

EXAMPLE

Price can be defined as Numeric with a maximum of 5 digits(decimal point not included) and 2 decimal places. Price is stored in cents and divided by 100 while reading.

Revenue can be Integer with 5 digits stored and 3 trailing zeros not stored. In other words, Revenue is stored in thousands and a multiplication factor 1000 is applied while reading.

Unit Sales can be defined as Integer with a maximum of 10 digits

Comments can be defined as BLOBs where any binary object (pictures, documents etc.) can be stored at dimension intersections.

Aggregatable Data Measure

Description

An aggregatable data measure is defined with an anchor (lower bound) level in each of its dependent dimensions. The data measure can have data values for a subset of intersections of lower bound level members of every dependent dimension. It also has values defined for all intersections in all the aggregation paths of the lower bound level members.

Optional levels called the "aggregation termination" levels can be specified for every dependent dimension. These levels should be same as or ancestors of the lower bound level. Only those intersections along the aggregation paths that contain members of the aggregation termination (upper bound) levels are defined. The intersections containing members of ancestor levels of the aggregation termination levels are not defined.

Aggregatable data measures use an aggregation method to generate data for an ancestor level member given data for all its children at one of its descendent levels. Examples of aggregation methods are sum, weighted average, min, max, or, and etc. In case of weighted average, a summarizable data measure is needed to provide weights.

Aggregatable data measures can only have data of types Numeric, Integer or Boolean and the aggregation integrity is maintained by the system.

An incremental aggregation method is one which can be used to compute the value at the parent knowing the old value of the parent, old value of the child, and the new value of the child when one of the children is changed. This lets us compute the parent value by accessing only the changed children. Sum and weighted average are examples of incremental aggregation methods.

If an odd number of dimension components of an intersection x, are flagged "not to be stored" (see section Hierarchical Dimension), the intersection is not stored. Otherwise, the intersection is stored. If an intersection within the defined bounds of a data measure is not stored, access routines will compute the value at run time from the children positions.

When a "to be stored" intersection becomes "not to be stored", the intersection is immediately flagged deleted and is not accessed. On the other hand, when a "to be stored" intersection becomes "not to be stored", it is added when the intersection is needed.

EXAMPLE

Unit Sales could be defined as a summarizable data measure dependent on Product and Geography dimensions with SKU and Region as the anchor levels. If the Unit Sales data values for [Chocolate Chip, Eastern Region], [Oatmeal Raisin, Eastern Region] and [Macadamia Nut, Eastern Region] intersections are 100,200 and 300 respectively, then system should ensure that the value at [Cookies Brand, Eastern Region] intersection is 600.

If the aggregation termination level is not specified, then intersections corresponding to the level combinations [Size, Region] and [AllProducts, Region] will be generated.

If the aggregation termination level is specified as Brand in the Product dimension then the combinations of [Size, AllProducts] will not be generated.

Allocatable Data Measure

Description

An allocatable data measure is an incrementally aggregatable data measure which has a dis-aggregation method defined. Dis-aggregation is the process of arriving at unique children values given a parent value and a profile (set of basis values).

Allocatable data measures can only have data of types Numeric, Integer and support aggregation methods: sum and weighted average.

Updating an Allocatable Data Measure

Description

When a data element is modified at an intersection, the change needs to be distributed down to the anchor level intersections within its scope based on a pre-defined criterion. The change also needs to be propagated to all ancestor member intersections of all defined aggregation paths for the data measure.

Update of anchor level intersections by multiple users/threads should be sequential, such that no two intersections common to any two update scopes are hit in different sequence. If intersection A and intersection B are in the update scopes of thread T1 and thread T2 and if T1 changes intersection A first, T1 should change intersection B also first and vice versa. This will result in one of the updates completely overriding the other and the end result will be consistent with at least one of the updates when the scopes overlap.

An online re-synchronization operation is provided since incremental update can only preserve "aggregation integrity" if it is a precondition.

An update operation can have the following parameters for each dependent dimension: A scope, an input level (below the level of the scope) at which the external input is obtained. A level combination sequence to follow (sequence needs to monotonically progress towards the lower bound level combination) during the allocation can be defined if an application provided basis needs to be used for allocation along the path. A default data base specified basis is used beyond the specified path to reach the lower bound combination.

EXAMPLE

In the aggregatable data measure example, if the Unit Sales data element corresponding to the [Cookies Brand, Eastern Region] intersection is changed from 600 to 900 the new values for [[Chocolate Chip, Eastern Region], [Oatmeal Raisin, Eastern Region] and [Macadamia Nut, Eastern Region] intersections should be 150, 300 and 450. The pre-defined criterion in this example is "preserve the existing proportions".

The update to the [SKU, Region] intersections also causes the data elements corresponding to the. [Size, Region] intersections to be updated because the members of the Size level fall in the relevant aggregation path for SKU.

If multiple users attempt to change the values for any of the intersections at [SKU, Region], the values at the. [Brand, Region] intersections should be the sum of the [SKU, Region] intersections after the operations are complete and no other updates are being performed on the data measure.

Non-Allbcatable Data Measure

Description

A Non-allocatable data measure is an aggregatable data measure with no dis-aggregation allowed. In other words, all updates are performed at the lower bound level combination and aggregated to higher levels. Aggregation is performed without assuming any pre-existing aggregation integrity and requires accessing all children of each node affected by an update.

Non-allocatable data measures can only have data of types Numeric, Integer and Boolean and support the aggregation methods: max, min, and, or etc. User defined aggregation can defined for pre-defined types.

User defined data types with user specified operations are supported. The operation should include a pre-defined aggregation method which is used to perform the aggregations along the dimensions. A user defined operation can be performed on a custom group of intersections.

Updating a Non-allocatable Data Measure

Description

A Non-allocatable data measure can only be modified at the lower bound level combination directly. The change is then propagated upwards using the aggregation method to all the parent nodes.

Update of all intersections by multiple users/threads should be sequential, such that no two intersections common to any two update scopes are hit in different sequence. If intersection A and intersection B are in the update scopes of thread T1 and thread T2 and if T1 changes intersection A first, T1 should change intersection B also first and vice versa. This will result in one of the updates completely overriding the other and the end result will be consistent with at least one of the updates when the scopes overlap.

An update operation needs to have just a scope specified for each dependent dimension. The external input is obtained at the lowest level and the data measure is updated.

Non-Aggregatable Data Measure

Description

A non-aggregatable data measure can have data at a subset of intersections of its dependent dimensions. Data at each intersection is independent of the data at other intersections. In other words, there is no "aggregation integrity" that needs to be maintained for non-aggregatable data measures. Updating a value for the non-aggregatable item updates the data element at the current intersection.

Users can add or delete any intersection subject to access restrictions. If an intersection does not exist, a higher level intersection is accessed, This is repeated in a user specified order until an intersection is found. On the other hand, update operation is performed only if the intersection exists.

Non-aggregatable data measures can have any of the data types listed in the data type section. User defined data types with user specified operations are supported. A user defined operation can be performed on a custom group of intersections.

EXAMPLE

Price, Seasonally are non-aggregatable data measures.

Seasonality can be defined as a non-aggregatable data measure at [Brand, Region], [SKU Region] and [SKU Territory] level intersections. Price can be defined as a non-aggregatable data measure at [SKU Region] level intersections. The access order could be defined as just Region. This will retrieve valid data from the Region level for all intersections at all descendent levels of Region. Data is not available at ancestor levels of Region and SKU.

Updating a Non-Aggregatable Data Measure

Description

All positions in a non-aggregatable data measure are independently update-able. A custom group can be specified for every dependent dimension. All existing intersections of the members of custom group are independently updated using application supplied data.

Data Cube

Description

A data cube is a set of similar data measures (all allocatable, all non-allocatable or all non-aggregatable) with the same dimensionability. A subset of the dimensions of the cube can be designated as dense.

A subset of all possible combinations of the rest of the dimensions is identified for the cube. The storage or non-storage of an intersection is defined by the types of data measures stored in the cube.

If the cube contains a non-aggregatable data measures, a custom group of members of each dense dimension is identified and all the intersections of these custom groups are stored in the cube.

In case of a non-allocatable data measures, a scope of members at the lower bound level of each data measure is identified for each dense dimension and all intersections of these scopes are stored in the cube. In other words, only the lowest level data is stored and higher levels are generated at run time.

In case of allocatable data measures, a scope of members at one of the levels at which the data measure is defined is identified for each dense dimension and all intersections of these scopes are stored in the cube. All the levels at which the data measure is defined, and are reachable from the stored level either through aggregation or dis-aggregation, are generated at run time.

What-if Update

Description

Any update operation can be saved as a what-if update without commit. The what-if update when active acts as a filter applied to the actual data that is retrieved. The data resulting will appear as if the update was committed to the database.

The what-if update can be committed if required.

This will only be implemented if the performance of a what-if update is better than a regular update (commit).

EXAMPLE

In the updating aggregatable data measure example if a what-if update of 900 is saved to the [Cookies Brand, Eastern Region] intersection, the actual data in the database corresponding to this intersection will still be 600 whereas when the what-if is applied it will appear as if the data is 900. The data at the [Chocolate Chip, Eastern Region] intersection will appear to be 150 even though it really is 100.

Locking a Dimension Intersection

Description

Locking a dimension intersection of an allocatable data measure should keep the value stored at the intersection unchanged while distributing the data from a higher level or propagating the change from a lower level.

Locking a dimension intersection of a non-allocatable data measure is equivalent to locking all the lower bound intersections within the scope of the locked intersection.

Locking/unlocking an intersection of a non-aggregatable data measure is treated as locking a single intersection. In other words, updates will skip the locked intersection.

EXAMPLE

In the aggregatable data measure example, if the Unit Sales data element corresponding to the [Chocolate Chip, Eastern Region] intersection is locked at 100 and if data element at [Cookies Brand, Eastern Region] intersection is changed from 600 to 900 the new values for [Oatmeal Raisin, Eastern Region] and [Macadamia Nut, Eastern Region] intersections should be 320 and 480. The existing proportions of the unlocked intersections are preserved while keeping the value at the locked intersection unchanged.

Mapping Dimension Members

Description

Members of two-dimensions, target and source, can be mapped to each other. Target and source can be defined using aliases and can refer to the same defined dimension. Mapping defines the source members used to compute a target member and is used in Relations and Virtual Data Measures.

Mapping can be defined using a relative definition: ancestor, children, siblings etc. Mapping can also be defined by enumerating the source target pairs.

Relation on a Data Measure

Description

A relation can be defined on a "target" data measure by associating an expression with it. The expression can contain one or more "source" data measures. Each data measure involved in the relation (including the target) has a dimensionality defined using aliases. The dimensionality of the target and source measures need not be the same. In other words, different aliases can be used for different measures to specify dimensionality. For each source dimension that do not match a target dimension(matching is by name and not by the defined dimension it refers to), the members of one of the target dimensions will need to be mapped to the members of the source dimension.

The relation expression can contain constants, source data measures, unary, binary and aggregation operators which are pre-defined. Aggregation operators are needed when a single target dimension member is mapped to multiple source dimension members. The relation definition also specifies whether the relation triggering is manual or automatic.

In case of automatic triggering, the relation triggering is transitive. In other words, if A is a source of a relation on B and B is a source of a relation on C and both are triggered automatically, both B and C are updated when A is modified. Cycles are detected by the system when the relations to be executed are being collected: if the target of a relation to be triggered is involved(either as source or target) in the relations already in the list of relations to be executed, then this relation is not added to the list.

Relation updates are non-incremental and all source positions required to compute a target position are accessed. Since any arbitrary expression can be used and reverse relations cannot be verified by the system, relation integrity is not guaranteed by the system.

If the target is an allocatable data measure, a level is identified for each dimension of the target at which the relation is computed. In case of non-allocatable data measures, the anchor level is used for computation. In case of non-aggregatable measures, all intersections are independently computed.

EXAMPLE

The Units data measure could have a relation defined on it with the expressions (GrossDollars/Price; GrossTons/Weight). Every update to the GrossDollars, Price, GrossTons or Weight data measures will re-calculate the Units data measure.

Virtual Data Measures

Description

Virtual data measure is a data measure which has no storage of its own, and its value at an intersection is computed at run time. It is non-modifiable. Each virtual measure is defined by an expression which is used to compute its value. The expression can contain constants, stored data measures, unary, binary and aggregation operators which are pre-defined. Expressions cannot contain other virtual measures.

The dimensionality of the virtual and stored measures need not be the same. Aliases can be used to refer to the same internal dimensions and each alias is treated as a different dimension for access. For each dimension of the stored data measure (source dimension)that do not match a dimension of the virtual measure(target dimension), the members of one of the target dimensions will need to be mapped to the members of the source dimension. Aggregation operators are used when a single target dimension member is mapped to multiple source dimension members.

Dimension Member Realignment

Description

Members of hierarchical dimensions can be realigned in one of the following two ways:
1. Moving: A subset of parents of a member of a dimension can be changed. The whole subtree under the member is moved from one set of parents to another set. The member specification can include a subset of its uniqueness thus moving multiple members possibly merging them into one target member. The target member specification can include a different subset of its uniqueness. The data corresponding to all the intersections that contain the moved member is moved.
2. Deleting: An existing member can be deleted. The whole subtree under the member is deleted. The member specification can include a subset of its uniqueness thus deleting multiple members. The data corresponding to all the intersections that contain the deleted member is voided.

An option to reject the operation is provided if the dimension member specification identifies multiple members of the dimension. All data measures depending on the realigned dimension are impacted.

The realignment operation should preserve the aggregation integrity of all aggregatable data measures. When deleting existing members, the system should ensure that there are no existing intersections for aggregatable data measures that do not have corresponding anchor-level intersections.

Realignment may require exclusive access to the data base and may be allowed only by the administrative client.

EXAMPLE

Consider the geography dimension with levels: National, District, DC, Account. The relations defined are: National>District, National>DC, DC>Account and District>Account. The uniqueness of Account is {DC, District, National}.

If the Account realignment specification is Move Account=Kmart from DC=New York and District=GreatLakes to District=TriState. All Kmart accounts belonging to NewYork(DC) and GreatLakes(District) are moved to New York(DC) and TriState(District).

If the Account realignment specification is Move Account=Kmart from DC=New York to DC=Michigan and District=TriState. All Kmart accounts belonging to NewYork(DC) and any District are moved to Michigan(DC) and TriState(District).

If the Account realignment specification is Move Account=Kmart from DC=New York to Account=Walmart and District=TriState. All Kmart accounts belonging to NewYork(DC) and any District are moved to WalMart (Account) within New York(DC) and TriState(District).

Moving Data Measure Intersection

Description

The dimension intersections within Data Measures,can be realigned. The source and target specifications can contain different subsets of dimensions. A subset of data measures dependent on the superset of the union of the source and target dimension sets can be realigned. The dimension specifications are the same as in case of Dimension Member Realignment.

If a dependent dimension of an Aggregatable data measure is not specified, all its members at the anchor level are considered as part of the source specification. If a dependent dimension of a Non-aggregatable data measure is not specified, all its members are considered as part of the source specification.

In case of Aggregatable Data Measures, the subtrees under all the intersections are moved along with the intersections. Otherwise, only intersections specified are moved. Dimension members ray be added, but are never deleted.

EXAMPLE

UnitSales is an Aggregatable Data Measure dependent on Geography, Product and Time and Price is a Non-aggregatable data measure dependent on Product, Customer and Time.

If an intersection of Product and Time is to be moved and the target specified contains the member of Product dimension alone, both UnitSales and Price or either one of them can be realigned. In case of UnitSales, the subtree under the Product part of the intersection is realigned for the given Time for all Geography positions. In case of Price, Product part of the intersection(not the subtree) is realigned for the given Time for all Customer positions.

If an intersection of Geography and Product is to be moved and the target contains intersections of Geography and Time dimensions, only UnitSales can be realigned. The subtree under the Product part of the intersection is realigned for the given Geography, and all Time members of the level specified in the target are realigned into one specified Time member and the subtrees under the all members are merged under one.

Deleting Intersections from Data Measures

Description

The intersection specification can contain a subset of dimensions. The intersections can be deleted from a subset of data measures who dimensionality includes all dimensions in the specification. The dimension specifications are the same as in case of Dimension Member Realignment. All intersections within the selected data measures matching the specification are deleted.

If a dependent dimension of an Aggregatable data measure is not specified, all its members at the anchor level are considered as part of the specification. If a dependent dimension of a Non-aggregatable data measure is not specified, all its members are considered as part of the specification.

In case of Aggregatable Data Measures, the subtrees under all the intersections are removed along with the intersections. Otherwise, only intersections specified are removed.

Security

Description

An object storage model is to be defined for OLAP. Access permissions can be set for each object (Dimensions, Levels, Members, Data Measures, Data at cell level) by user, group etc. The access privileges can be Read, Modify, Add, Delete, etc.

Distributed OLAP

Description

The distribution of data is done subject to the following guidelines:
  Separate the dimension view exposed to the applications from the data storage
  Store data such that all updates, locking can be performed without having to access data from other sub-cubes
  Provide mechanisms to minimize cross sub-cube data access while computing relations and virtual data measures
Multi-dimensional data can be distributed into sub-cubes along a dimension. Each sub-cube can be further distributed along the same or a different dimension.
The following are the two ways of distributing sub-cubes along a dimension:
1) Partitioning the levels of a dimension
  The levels are partitioned into two sets with one of the levels belonging to both sets. All paths from a level belonging to one set to a level belonging to the second set need to pass through the common level. In a set, if a level is a parent(child) of the common level, there does not exist a level in the set which is a child(parent) of the common level.
2) Partitioning the instances of a dimension
  The partitioning of the instances is done at a level which is a parent of all levels in the sub-cube being partitioned. In other words, it is the highest level of the sub-cube. All levels belong to both sub-cubes.

A sub-cube can also be partitioned by data measures also. Relations and virtual data measure definitions cannot span multiple sub-cubes when the partitioning is done by data measures.

All data access is synchronous. If the process servicing a sub-cube is down, the data cannot be accessed.

Propagation of updates may need to be asynchronous. Even if the process servicing the sub-cube is down, the data needs to be guaranteed to be updated eventually.

The allocation paths are restricted such that the lowest level of each sub-cube is in the allocation path, if the allocation path spans multiple sub-cubes. This is required to limit the allocate and following aggregation operation to a sub-cube.

In summary, the described method allows selected data at selected intersections of a multidimensional database to be locked. This is extremely useful for planning purposes, allowing changes to be made to the database with some intersections locked. This allows complex "what-if" scenarios to be evaluated, with all changes affecting only other intersections that are allowed to vary. For example, a particular customer can be locked so that it will always receive its desired number of units, regardless of what other changes are made in allocations.

While the invention has been particularly shown and described with reference to a preferred embodiment, it will be understood by those skilled in the art that various changes in form and detail may be made therein without departing from the spirit and scope of the invention.

What is claimed is:

1. A method for locking intersections in a multidimensional database having members organized into levels, comprising the steps of:
  for a selected level, defining an anchor level therefore;
  choosing a member of the selected level to be locked;
  defining as a constraint set all members of the defined anchor level that are descendants of the selected member;
  for all anchor level members that are in another constraint set, reassigning such members to new constraint sets so that each anchor level member is in exactly one constraint set; and
  for all anchor level members not already in a constraint set, placing such members into a new constraint set.

2. The method of claim 1, further comprising the steps of:
  when updating values in the database, for each member of any constraint set, updating such member only if an update can be made such that an aggregatable data measure, for all locked intersections to which the constraint set belongs, is unchanged.

3. The method of claim 1, further comprising the steps of:
  when unlocking a locked intersection, reallocating anchor level intersections that are descendants of the unlocked intersection to constrained sets of other locked intersections, and allocating such intersections to an unconstrained set for those intersections not covered by another locked intersection.

* * * * *